United States Patent [19]

Pollard et al.

[11] Patent Number: 5,754,870
[45] Date of Patent: May 19, 1998

[54] POWER MANAGEMENT OF A COMPUTER PLUG-IN CARD HAVING A REMOTE DATA LINK

[75] Inventors: Thomas G. Pollard, San Diego; Rodney J. Corder, Huntington Beach, both of Calif.

[73] Assignee: New Media Corp., Irvine, Calif.

[21] Appl. No.: 602,901

[22] Filed: Feb. 16, 1996

[51] Int. Cl.[6] .................................................. G06F 1/32
[52] U.S. Cl. ........................ 395/750.05; 395/750.03
[58] Field of Search .......................... 395/750, 281–283, 395/750.01, 750.03, 750.05, 750.06; 364/707

[56] References Cited

U.S. PATENT DOCUMENTS

| | | |
|---|---|---|
| 5,396,635 | 3/1995 | Fung ................................ 395/800 |
| 5,396,636 | 3/1995 | Gallagher et al. ............... 395/750 |
| 5,408,668 | 4/1995 | Tornai ............................. 395/750 |
| 5,421,018 | 5/1995 | Hiyama .......................... 395/800 |
| 5,442,697 | 8/1995 | McGary et al. ................. 379/399 |
| 5,546,590 | 8/1996 | Pierce ............................. 395/750 |
| 5,606,704 | 2/1997 | Pierce et al. ................... 395/750 |

Primary Examiner—Jack B. Harvey
Assistant Examiner—Sumati Lefkowitz
Attorney, Agent, or Firm—Gregory Garmong

[57] ABSTRACT

A computer system includes a computer and a plug-in card having a remote data link. The plug-in card draws power from the power sour the computer. A status monitor shows the operability of the remote data link, specifically whether it is operable for data communications to or from the computer, and its connection to the plug-in card. Power to the plug-in card is controlled responsive to the status monitor, so that power to the card is enabled only when the external data link and its connector are operable.

20 Claims, 3 Drawing Sheets

POWER MANAGEMENT OF A COMPUTER PLUG-IN CARD HAVING A REMOTE DATA LINK

BACKGROUND OF THE INVENTION

This invention relates to a computer system having a plug-in card with remote data link capability, and, more particularly, to the power management of the plug-in card in the computer system.

Computer systems include those which are always operated from a line power source, such as desktop computers, and those which operate from internal battery power for all or a portion of the time, such as portable computers. Examples of the latter group include palm-top, lap-top, and notebook computers. Such computers typically have batteries that provide the power to the computer and its associated systems when the computer is operated under conditions where a line power source is not available. The present invention deals primarily with such computer systems operable from a battery power source but which also usually have the ability to operate and to recharge the battery from a line power source, termed a "portable computer" here. However, it is also applicable to desktop computers where, for some reason, there is a desire to conserve energy through careful power management.

The development of portable computers reflects a continued miniaturization of the electronic components and reduction of their power requirements, as well as improvements to the battery life. The operating time of the computer on a single battery charge is a function of the battery storage capacity and the power consumption of the computer and associated systems that draw power from the computer. Traditionally, the largest consumer of power in most portable computers has been the display, but advances in display technology have reduced its power requirements so that other components have become relatively more significant consumers of power.

One such user of power is plug-in cards that have a remote data-link capability. The portable host computer usually has an external connector, often termed a "slot", into which an external card is inserted. A major class of such external plug-in cards are those which incorporate a remote data communication capability, allowing the host computer to perform external data communications through the plug-in card. Examples include local area network (LAN) cards, modem cards, speaker cards, video grabber cards, and small computer systems interface (SCSI) cards.

The plug-in cards with remote data-link capability draw power from the host computer when they are inserted into the external slot, whether or not there is data communications underway. With the reductions in power consumption of the computer's internal components such as the display that have been achieved, the power consumption of the plug-in card has become relatively much more significant and in some cases becomes a key consideration in the determination of operating life of the computer system on a single battery charge. For example, if the user forgets to unplug the plug-in card when it is not in use, the continuing power drain can substantially shorten the operating life of the computer system between battery chargings.

Power management of the portable computer itself has long been known. If the computer is turned on but has not been used for a period of time, the display and possibly other systems are turned off until next required. The present inventors have recognized that power management of the plug-in card with remote data-link capability is not so easily accomplished, because in many instances the plug-in card is operated in a peer mode wherein other computers can access the host computer of the plug-in card. The host computer therefore cannot simply turn off the power to the plug-in card when the host computer does not require its use, because some remote computer may require its use. If the power to the plug-in card is disabled when the remote computer seeks to access the plug-in card through the remote data link, the system is not operable for its intended purpose. Thus, the approach to date has been simply to enable power to the plug-in card at all times, resulting in a reduction in the operating time on a single battery charge.

There is a need for an improved approach to the power management of computer systems having an external or an internal plug-in card with remote datalink capability. The present invention fulfills this need, and further provides related advantages.

SUMMARY OF THE INVENTION

The present invention provides a computer system with a plug-in card having a remote data link capability, a power management system for the plug-in card, and an approach for conserving the power of the computer. Power consumption of the card is reduced, even when the computer system is operated in a peer mode. The operating life of the computer system between battery charges is thereby increased. A preferred implementation of the invention does not itself require power consumption in order to operate.

In accordance with the invention, a computer system comprises a computer having a power source and a connector, and a plug-in card with remote data link capability. The plug-in card draws power from the power source of the computer. The computer system further includes power management means for sensing the operability of the remote data link capability when the plug-in card is inserted into the connector, for providing power from the power source to the plug-in card when the plug-in card is inserted into the connector and when the remote data link capability is operable, and for disabling power from the power source to the plug-in card when the plug-in card is inserted into the connector and when the remote data link capability is not operable. The power management means preferably includes a status monitor indicative of the operability of the remote data link capability, and a power connect switch operable responsive to the status monitor, located between the power source in the computer and the power-consuming elements on the card.

More specifically for one embodiment, a computer system comprises a computer having a power source with a power source output and a computer/card connector into which a plug-in card may be inserted. The computer/card connector includes a computer power connector element. A computer power transmission line communicates between the power source output and the computer power connector element. The computer system has a plug-in card receivable into the externally accessible connector. The plug-in card comprises a card/computer connector having at least one card power connector element which is in electrical communication with the computer power connector element when the card/computer connector is connected to the computer/card connector, a power-consuming component on the plug-in card having a power consumption input, a card power transmission line communicating between the card power connector element and the power consumption input, and a card/data link connector that may be mated with a remote data link. The computer system also includes a status monitor in one of the computer and the plug-in card. The status monitor produces a status monitor output signal indicative of the operability of the card/data link connector and the remote data link. A controllable power connect switch is disposed in one of the computer power transmission line and the card power transmission line, whereby the power source output is in electrical power communication with the power consumption input when the power connect switch is closed and the plug-in card is received into the externally accessible connector, and is not in electrical power communication with the power consumption input when the power connect switch is open and the plug-in card is received into the externally accessible connector. The power connect switch has a control input which determines whether the power connect switch is open or closed. A power controller is in operable communication with the control input of the power connect switch. The power controller receives and acts responsively to the status monitor output signal.

With these approaches, the operability of the remote data-link capability is sensed. Such operability status can include any operable indicator of communications link operability, and the selection of the indicator depends upon the type of plug-in card that is in use. For example, if a proper card/data link connector is not in place, power to the plug-in card would be disabled. Even if there is a proper card/data link connector, the plug-in card would be disabled if there is no data link, remote computer, proper termination, or the like which would permit the remote communication through the plug-in card.

The present approach can be implemented with the power controller provided either in additional hardware logic or in a sequence of software instructions, such as executed in the central processing unit of the computer. The latter is preferred, because the addition of additional hardware logic would itself result in increased power consumption in the computer.

This present invention is to be distinguished from conventional computer power management wherein the power to the computer and, optionally, peripheral systems, is disabled where the computer has not been used for a period of time. In such a conventional approach, the power to the plug-in card would be enabled as long as the host computer is being used, regardless of whether the plug-in card cannot possibly be used because there is no remote data link communicating with the plug-in card. The present approach can be used in conjunction with conventional computer-use-based power management techniques, but it goes well beyond such conventional techniques to control plug-in card power use based upon operability of the card.

The present invention provides an advance in the art of computer systems having limited power capability and which utilize a plug-in card for external data communications. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
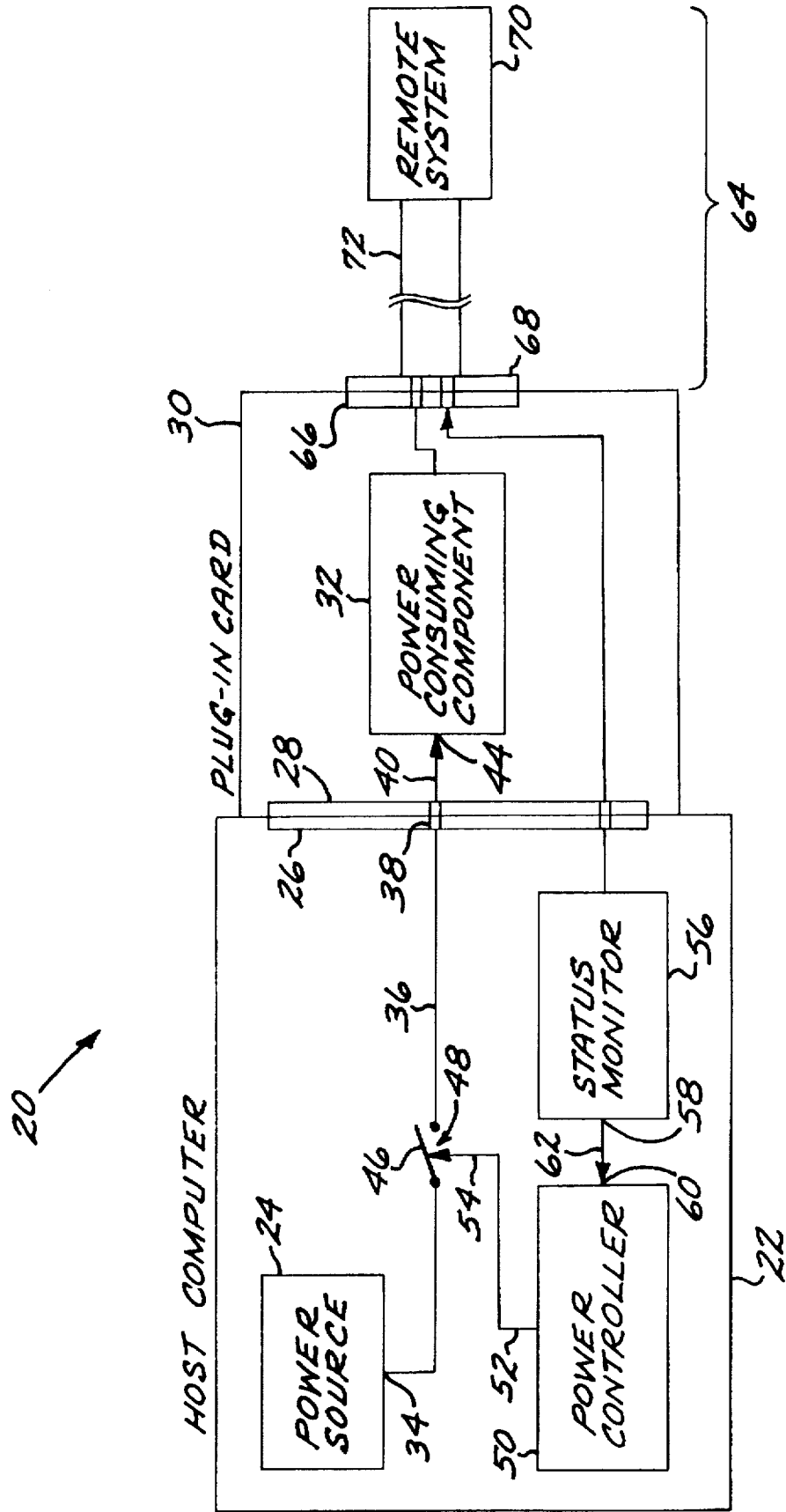
FIG. 1 is a schematic diagram of a first embodiment of the invention.
Figure 2:
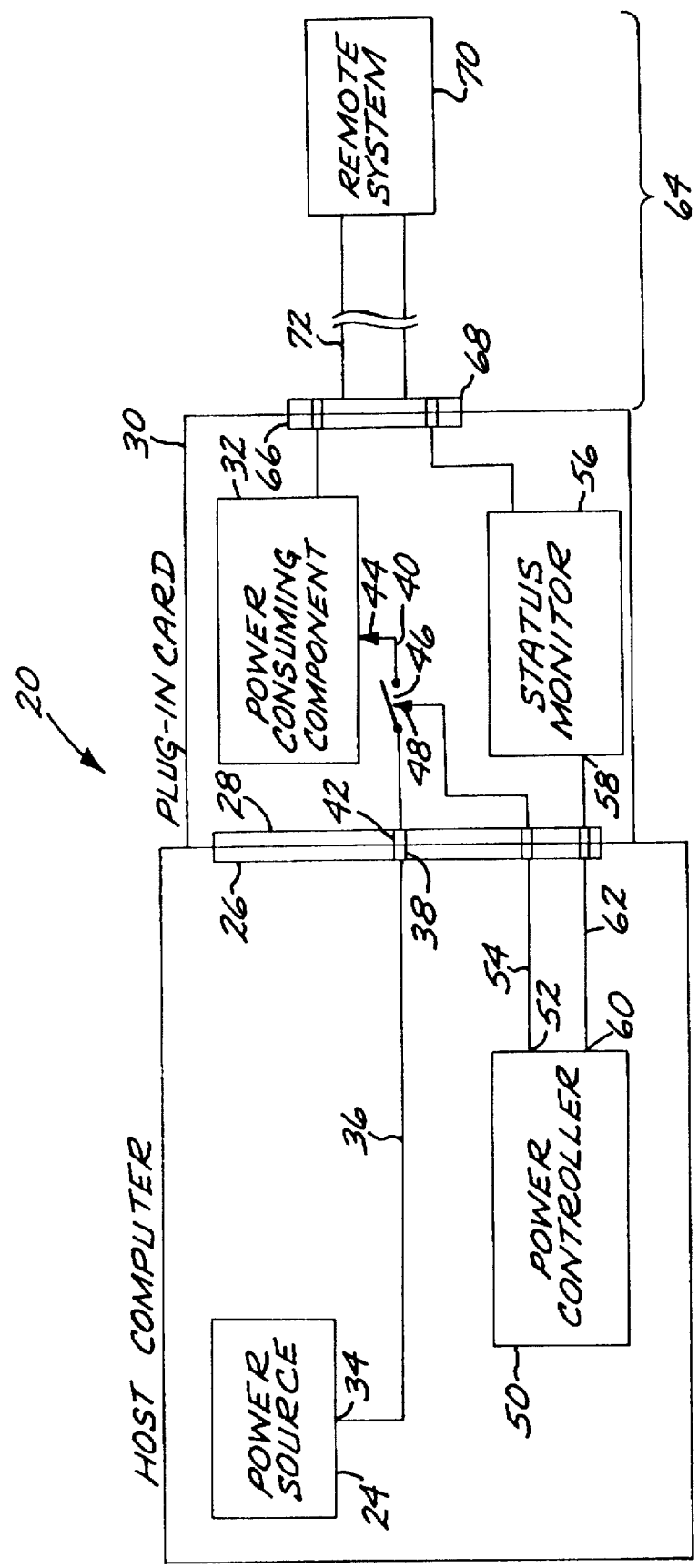
FIG. 2 is a schematic diagram of a second embodiment of the invention.

FIGS. 1 and 2 illustrates two preferred embodiments of a computer system 20 utilizing the present invention. The computer system 20 includes a computer 22, which is preferably a portable computer such as a palm-top, a lap-top, or a notebook computer. The computer 22 includes a power source 24, which is a battery or other type of power source that permits operation of the computer 22 when it is not connected to line power. The computer also typically includes a line-source connection and a charger that permits recharging of the battery when line-source power is available, or the battery may be removable and replaceable.

In the preferred embodiment, the computer 22 also includes an externally accessible computer/card connector 26, preferably a standard 68-pin connector, into which a compatible card/computer connector 28 of a plug-in card 30 may be inserted without opening a housing of the computer 22 or otherwise exposing its interior. Examples of plug-in cards 30 include local-area network (LAN) cards, small computer systems interface (SCSI) cards, modem cards, speaker cards, and video grabber cards. These are the types of portable computers and cards currently of most interest to the inventors and for which the present invention yields the greatest advantages, but the invention is not so limited and may be used for other types of cards, for internally plugged-in cards, and for desk top computers.

The plug-in card 30 has a power-consuming component 32 thereon. Power for the power-consuming component 32 is supplied from a power source output 34 of the power source 24 through a computer power transmission line 36 that communicates between the power source output 34 and a computer power connector element 38 on the computer/card connector 26, and thence through a card power transmission line 40 that communicates between a card power connector element 42 on the card/computer connector 28 and a power consumption input 44 on the power-consuming component 32.

A controllable power connect switch 46 is positioned in either the computer power transmission line 36 (embodiment of FIG. 1) or the card power transmission line 40 (embodiment of FIG. 2). The switch 46 has a control input 48. A power controller 50 has a command output 52 in operable communication with the control input 48 of the switch 46 through a switch control line 54. The command output 52 is either a "power enable" command closing the switch 46 or a "power disable" command opening the switch 46. Where the power controller 50 and the switch 46 are in the same housing, such as in the computer housing in FIG. 1, the switch control line 54 is in the form of a single unbroken line. Where the switch 46 is on the card 30, as shown in FIG. 2, the switch control line 54 passes through corresponding elements on the connectors 26 and 28. Operation of the power controller 50 serves to open or close the switch 46, thereby enabling or disabling power to the power-consuming component 32.

A status monitor 56 is provided in the computer system 20, either in the computer 22 (embodiment of FIG. 1) or on the card 30 (embodiment of FIG. 2). The status monitor 56 has a status monitor output signal 58 that is in communication with a power controller input 60 of the power controller 50 through a status signal line 62. The status monitor output signal 58 is either a "link operable" signal indicating that the card/data link connector 66 and the remote data link 64 are operable for data transmission, or a "link not operable" signal indicating that the card/data link connector 66 and the remote data link 64 are not operable for data transmission. Where the status monitor 56 and the power controller 50 are in the same housing, such as in the computer housing in FIG. 1, the status signal line 62 is in the form of a single unbroken line. Where the status monitor 56 is on the card 30, as shown in FIG. 2, the status signal line 62 passes through corresponding elements on the connectors 26 and 28.

The power controller 50 and the status monitor 56 are depicted herein as separate physical elements, because they may be placed in separate components of the computer system as shown in FIGS. 1 and 2. Most preferably, the power controller 50 and the status monitor 56 are both embodied in the central processing unit of the host computer 22, as sets of logic instructions. It is preferred that these functions be accomplished by logic instructions rather than hardware elements, which is an acceptable alternative, in order to avoid added power consumption in the computer system 20.

The plug-in card 30 is in communication with a remote data link 64. The plug-in card 30 includes a card/data-link connector 66 thereon. The remote data link 64 includes a data link connector 68 that may be mated with the card/data-link connector 66. The remote data link 64 also includes a remote system 70 that is in communication with the card/data-link connector 66 through a data-link cable 72. The nature of the remote system 70 is related to the nature of the plug-in card 30. For example, for a SCSI plug-in card, the remote system is a peripheral system. For a LAN plug-in card, the remote system is a computer network. For a modem card, the remote system is a telephone system. For a speaker card, the remote system is a sound-producing element such as a speaker or headphone. For a video-grabber plug-in card, the remote system is a video acquisition device.

The status monitor 56 monitors the operability of the card/data-link connector 66 and the remote data link 64. If the card/data-link connector is not operable for its intended purpose, that information is provided as the status monitor output signal 58 to the power controller 50 through the status signal line 62 The power controller 50 provides a disable control input 48 to the switch 46 through the switch control line 54, and the switch 46 is opened so that no power is provided to the power-consuming component 32. If the card/data-link connector is operable for its intended purpose, that information is provided as the status monitor output signal 58 to the power controller 50 through the status signal line 62. The power controller 50 provides an enable control input 48 to the switch 46 through the switch control line 54, and the switch 46 is closed so that power is provided to the power-consuming component 32.

By this approach, power is provided to the power-consuming component 32 only when it is needed, as determined by the status of the remote data link 64. If, for example, the user of the computer leaves the card 30 plugged into the computer 22 even when the data-link connector 68 is not plugged into the card/data-ink connector, power to the card 30 is disabled so that there is no needless power drain from the power source 24.

For some desk-top computers wherein the power source is line power, the relatively small power drain associated with unnecessary power enablement to the card 30 is of substantially no concern, but in other cases the power drain may be a concern. On the other hand, such an unnecessary power enablement in a portable computer system can result in a significant reduction of the operating life of the computer system between battery chargings. The present invention minimizes, and ideally avoids entirely, such an unnecessary power drain.

The "the operability of the card/data-link connector 66 and the remote data link 64" is determined from the nature of the plug-in card 30 and the remote data link 64. Where the operation of the plug-in card 30 involves only communications initiated by the host computer 22 to the remote system 70 (but with subsequent communications occurring in both directions), "client mode" in a LAN system, operability is typically established by determining both that the remote data link 64 is functional and also that the host computer 22 requires access to the remote data link 64. Where the operation of the plug-in card 30 involves communications that may be initiated by the remote system 70 to the host computer 22 or initiated by the host computer 22 to the remote system 70 (but with subsequent communications occurring in both directions), "peer mode" in a LAN system, operability is typically established solely by determining that the remote data link 64 is functional. That is, in "peer mode" LAN operation, the card 30 must be powered at all times where there is a functional remote data link 64 so that the host computer 22 is accessible to the remote system 70 upon demand of the remote system. The client mode and peer mode of the LAN system have their analog in other types of cards 30 according to a determination of whether the communications across the data link is initiated only from the host computer or by the remote system as well.

Figure 3:
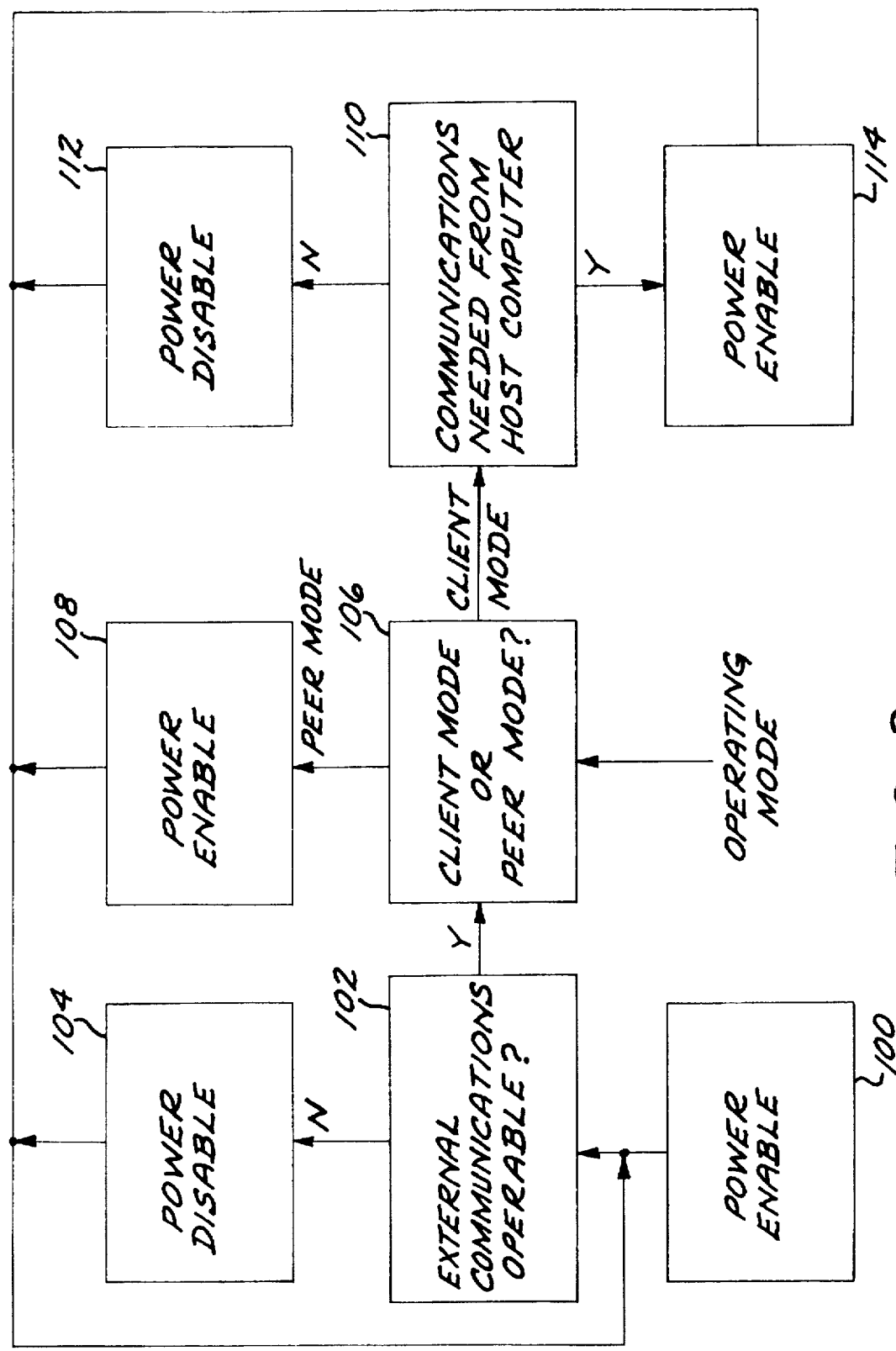
FIG. 3 is a block flow diagram for the operation of the power controller.

FIG. 3 depicts the logic followed by the power controller 50 in the preferred case wherein the card 30 is a LAN card. The command output 52 is initially "power enable", numeral 100. The external communications operability is checked by checking the status monitor output signal 58, numeral 102. If the output signal 58 is "link not operable" (N output at numeral 102), the command output 52 is set to "power disable", numeral 104. That is, if the external data link is not operable, there is no reason to enable power to the card 30 regardless of the client or peer operating mode of the computer system. If, on the other hand, the output signal 58 is "link operable" (Y output at numeral 102), the operating mode is checked, numeral 106, to determine whether the computer system is operating in client mode (i.e., communications are initiated only by the host computer) or in peer mode (i.e., communications are initiated by either the host computer or the remote system). This operating mode information is an input value. If the computer system is in peer mode, the command output 52 is set to "power enable", numeral 108, because the communications link must be powered in the event that a remote communications initiation request is made. If the computer system is in client mode, the central processor of the host computer is checked to determine whether there is a need for any external communications capability. If there is no need (N output at numeral 110), the command output 52 is set to "power disable", numeral 112. If there is a need for external communications capability generated by the host computer (Y output at numeral 110, the command output 52 is set to "power enable", numeral 114.

The determination of whether the card/data link connector and the remote data link are operable for data transmission, numeral 102 of FIG. 3, may be made by any operable technique, including either or both of manual condition input or automatic checking of the operability by the status monitor 56. To perform the automatic checking of operability, there is first made a determination of whether any data has been received through the remote data link 64 within some specified period of time. If there has been a reception of data, external communications is judged operable and the output signal 58 is set to "link operable". In a preferred approach, a counter (NoReceiveCount) is set to a maximum value (MaxNoReceiveCount). A timer is established such that a checking routine is called every PollPeriod Seconds using the computer's internal clock interrupt. If data has been received through the remote data link 64, a flag (DataReceived) is set. Every PollPeriod seconds, the timer routine is called. If the flag DataReceived is set indicating data reception through the remote data link 64 during the last timer interval, the counter NoReceiveCount is reset to the maximum value MaxNoReceiveCount, the output of step 102 is set to Y, and the timer routine is exited. If the flag DataReceived is not set, the counter NoReceiveCount is decremented. If the counter does not equal zero after decrementing, the timer routine is exited. If the NoReceiveCount counter does reach zero after decrementing, a check is performed to determine whether the absence of external communications is due to an absence of a proper external cable, an absence of a remote system, or the like. To make this determination, a check is made for a "good link" signal, which is used on nearly all remote data links. In the case of the preferred 10Base-T cabling, the "good link" signal originates at the 10Base-T concentrator. If the "good link" signal is detected, it is concluded that the remote data link is good, and that no communication has been received simply due to lack of demand. The counter NoReceiveCount is set to MaxNoReceiveCount and the timer routine is exited. If, on the other hand, there is no "good link" signal, the output of step 102 is set to N.

The indication of an absence of a "good link" signal is optionally verified. In this event, the card 30 is set to an external loopback mode and a short data packet is transmitted to the remote data link, addressed to return back to the card. If the self-directed data packet is received back by the card, it is concluded that the remote data link is operable and that the absence of a "good link" signal can be ignored. The output of step 102 is set to Y, the counter NoReceiveCount is set to MaxNoReceiveCount, and the timer routine is exited. This approach is used to determine the proper cabling both locally (i.e., whether the card is properly connect to the remote data link) and remotely (i.e., the card's cable is not connected to a hub (10Base-T) or is improperly terminated (10Base-2).

FIG. 3 is structured for the case where the operating (peer or client) mode can be changed over time in the computer system. If the operating mode is preestablished as a single, unchangeable mode, the logic of FIG. 3 is simplified accordingly.

The self-directed data packet may optionally be used to determine whether the remote data link is properly terminated. In the absence of a proper termination, communications is not reliable. The detection of termination problems is often difficult for inexperienced computer users, and the present diagnostic can aid in making this detection. There are typically five scenarios which are tested using status registers on the card 30 following receipt of the self-directed data packet. In the first scenario, if there is no proper cabling (i.e., no cabling or improper cabling), a "loss of carrier" status register is detected. In the second scenario, if there is a proper 10Base-T cable but it is not connected to a hub, the "loss of carrier status" register would also be found. In the third scenario, if there is a 10Base-2 dongle with an improperly terminated cable, a "retry" status register is detected. In the fourth scenario, if there is a 10Base-2 dongle but no cabling, a "retry" error is detected. In the fifth scenario, if there is a 10Base-2 dongle with a properly terminated cable, the self-directed data packet is received error free.

The determination of whether to enable power to permit communications from the host computer, numeral 110 of FIG. 3, is preferably made by an approach similar to that used in step 102. Initially, a counter NoTransmitCount is set to a maximum value MaxNoTransmitCount. A timer is established such that a routine is called every TransmitPollPeriod seconds, using the computer's internal clock interrupt. (TransmitPollPeriod may be selected to be the same duration as PollPeriod.) If there is a request that the computer transmit data to the remote data link, the following actions are performed. If the card power is disabled, the power controller reapplies power and the card is re-initialized for use, a flag DataTransmitted is set, and the data is transmitted. Thereafter, every TransmitPollPeriod seconds, the timer routine is called. If the DataTransmitted flag is set indicating data transmission during the last timer period, the counter NoTransmitCount is reset to MaxNoTransmitCount, and the timer is exited. If the flat DataTransmitted flag is not set, the counter NoTransmitCount is decremented. If the counter does not equal zero after decrementing, the timer routine is exited. If the NoTransmitCount counter reaches zero after decrementing, the timer routine sets the power controller output signal to "power disable" and exits the routine. Power is reapplied by setting the power controller output signal to "power enable" the next time that data transmission is requested.

The present invention has been reduced to practice according to the principles discussed herein. Appendix A contains a program listing in C language of this reduction to practice.

The performance of the computer system may be optimized by selecting the values of PollPeriod (w), TransmitPollPeriod (x), MaxNoReceiveCount (y), and MaxNoTransmitCount (z), to balance power consumption against responsiveness of the computer system measured as the time required to re-establish power and operability of the plug-in card 30 after its power has been turned off to conserve power. Thus, for example, as MaxNoReceiveCount and/or MaxNoTransmit Count are increased, power usage is increased and connect delay is decreased. A cost function is developed and optimized for user preferences and behavior. The cost function is developed by first defining P (average power consumption)=f(w,x,y,z), T (average transmit delay, the delay before a packet transmit request is accomplished, which is affected by peripheral power-up delay when transmission requested when power removed)=g(w,x,y,z), and R (average receive delay, the time delay before a newly attached cable is detected and a peripheral is powered-up, allowing peer-mode access)=h(w,x,y,z). The specific form of the relations f, g, and h are determined by the user to reflect the performance of each computer system, and cannot be specified in general. A cost function C is formed, for example, as C=αf+βg+γh, where α, β, and γ are user-selected constants reflecting the priorities assigned to P, T, and R, and cannot be specified in general. The cost function C is minimized by known function optimization techniques such as a gradient descent adaption algorithm such as a least mean squares approach, leading to values of w, x, y, and z which reflect the performance of the particular computer system and the preferences of the user.

Although a particular embodiment of the invention has been described in detail for purposes of illustration, various modifications and enhancements may be made without departing from the spirit and scope of the invention. Accordingly, the invention is not to be limited except as by the appended claims.

APPENDIX A

```
VOID FAR DriverPowerManagementPoll(VOID)
    LPVOID lptempPtr;
    _asm push    ds
    _asm push    es
    _asm mov     ax, cs:data_segment    //Get data segment
    _asm mov     ds, ax
    _asm mov     es, ax
    //If !APMEnabled (e.g., disabled with APM Utility), exit without
    //rescheduling timer call back.
    if (!APMEnabled)
            goto lblDriverTimeOut_L90;
    //If busy elsewhere, skip this stuff
    if (CableProbeMode || Test Mode || (CardStatus != CardInserted) || MovingData || InClientRequest)
            goto lblDriverTimeOut_L80;
    //If waiting on a transmit interrupt, do not disturb
    if (!InternalSleepMode && pkts_queued)
            goto lblDriverTimeOut_L80;
    _asm sti              //Make sure system Ints enabled
    //If in InternalSleepMode, perform cable probe to see if cable connected.
    if (InternalSleepMode)
    {
            //Always decrement NoTxCount if asleep.
            if (NoTxCount)
                    NoTxCount--;
            //If in ClientMode and asleep, skip cable probing stuff. Note that this makes
            //Client Mode supersede Peer Mode, but it stops some possibly annoying, and
            //more or less unnecessary, pinging.
            if (ClientMode)
                    goto lblDriverTimeOut_L80;
            //Need to wake up card to poke it
            UserInfo.EventCode = POWER_ON;
            If (CallClientDriver(MODIFYPOWERSTATE, (LPUserInfoStruct) &UserInfo) !=
                    CLIENT_SUCCESS)
            {
                    goto lblDriverTimeOut_L80;    //If failure, e.g., CS Busy, try again later
            }
            //Treat like card insertion
            //Reset the adapter
            hw_reset();
            //Re-establish the packet filter.
            hw_rcv_setmode(SS_Status.RxFilter,0,0);
            //"Open" the card
            hw_open(0,0,0);
            pkts_queued = 0;           //Reset number of Tx Buffers filled
            last_pkts_queued = 0;      //Reset flag used for cable disconnect msg
            //Probe the cable
            if (CableProbe(iobase, RUNLOOPCOUNT, (PBYTE)) SS_Char.CurAddr))
            {
                    //No cable.
                    //Shut down the power again. Note: If failure
                    //on power down, just ignore until next timeout.
                    UserInfo.EventCode = POWER_OFF;
                    CallClientDriver(MODIFYPOWERSTATE, (LPUserInfoStruct) &UserInfo);
                    //Set InternalSleepMode flag
                    InternalSleepMode = 1;
                    //Reset Buffer variables to avoid infinite loops
                    pkts_queued = 0;           //Reset number of Tx Buffers filled
                    last_pkts_queued = 0;      //Reset flag used for cable disconnect
            }
            else    //Cable is connected!
            {
                    //Reset timeout variables. Need some minimum time between
                    //power modifications to lesson annoyance.
                    NoRcvCount = MaxNoRcvCount;
                    NoTxCount = MaxNoTxCount;
                    //Reset flag to allow messages
                    ConnectedOnce = 1;
                    //Reset counter to allow messages
                    ConnectCableMsgCount = 0;
                    //Reset InternalSleepMode flag
                    InternalSleepMode = 0;
                    //Re-establish open-close state
                    if(!(SS_Status.status & 0x0010))    //test "open" bit
                    {
                            //Loop before shutting down so don't
                            //get buffers messed up
                            while(pkts_queued)
                                    NoRcvCount = MaxNoRcvCount;
```

APPENDIX A

```
                            __asm   cli
                            hw_stop();        //halt adapter
                            __asm   sti
                    }
            }
    }
    else       //NOT in InternalSleepMode
    {
            //If in ClientMode, check for transmit activity
            if (ClientMode)
            {
                    if (SentSomething)
                            NoTxCount = MaxNoTxCount;
                    else    //Did not transmit during last poll period
                    {
                            if (NoTxCount)
                                    NoTxCount--;
                            //If decremented to 0, go to sleep
                            if (!NoTxCount)
                            {
                                    //Shut down the power
                                    UserInfo.EventCode = POWER_OFF;
                                    //If failure on Power Down, do NOT
                                    //set flags. Try again next time.
                                    if (!CallClientDriver(MODIFYPOWERSTATE,
                                                    (LPUserInfoStruct) &UserInfo))
                                    {
                                            //Sucessful Power Down
                                            //Set InternalSleepMode flag
                                            InternalSleepMode = 1;
                                            //Reset Buffer variables to avoid infinite loops
                                            pkts_queued = 0;         //Reset Tx Buffers filled
                                            last_pkts_queued = 0;    //Reset flag used for cable
                                                                     //disconnect
                                    }
                                    //Bail out
                                    goto lblDriverTimeOut_L80;
                            }
                    }
            }       //End if ClientMode
            //Check for receive activity
            if (HeardSomething)
            {
                    NoRcvCount = MaxNoRcvCount;
            }
            else    //Did not hear any network activity during last poll period
            {
                    //Decrement counter
                    if (NoRcvCount)
                            NoRcvCount--;
    //If NoRcvCount decremented to zero, check cable
    if (!NoRcvCount)
    {
            //If adapter "closed", open it so can ping cable
            if(!(SS_Status.status & 0x0010))    /* test "open" bit */
                    hw_open(0,0,0);
            //Probe the cable
            if (CableProbe(iobase, RUNLOOPCOUNT, (PBYTE)
                            SS_Char.CurAddr))
            {
                    //No cable.
                    //Shut down the power.
                    UserInfo.EventCode = POWER_OFF;
                    //If failure on Power Down, do NOT
                    //set flags. Try again next time.
                    if (!CallClientDriver(MODIFYPOWERSTATE,
                                    (LPUserInfoStruct) &UserInfo))
                    {
                            //Successful Power Down
                            //Set InternalSleepMode flag
                            InternalSleepMode = 1;
                            //Reset Buffer variables to avoid infinite loops
                            pkts_queued = 0;         //Reset Tx Buffers filled
                            last_pkts_queued = 0;    //Reset flag used for cable
                                                     //disconnect
                    }
            }
            else    //Cable is connected!
```

-continued

APPENDIX A

```
{
        //Reset NoRcvCount
        NoRcvCount = MaxNoRcvCount;
        //Reset flag to allow messages
        ConnectedOnce = 1;
        //Reset counter to allow messages
        ConnectCableMsgCount = 0;
        //Re-establish open-closed state
        if(!(SS_Status.status & 0x0010))  /* test "open" bit */
        {
                //Loop before shutting down so don't
                //get buffers meesed up
                while(pkts_queued)
                        NoRcvCount = MaxNoRcvCount;
                __asm   cli
                hw_stop();              //halt adapter
                __asm   sti
        }
        }       //End if !NoRcvCount
}       //End HeardSomething else
        }       //End InternalSleepMode else
lblDriverTimeOut_L80:
        //Reset activity flags
        HeardSomething = 0;
        SentSomething = 0;
        //Schedule another Timer CallBack from CHIMP95. Fill in CSDBuffer field with
        //pointer to LANTimerCallBackBuff, but ignore other fields since unused.
        __asm   mov ax, OFFSET DriverTimeOut
        __asm   mov WORD PTR lptempPtr[0], ax   //Get DriverTimeOut Offset
        __asm   mov ax, SEG DriverTimeOut
        __asm   mov WORD PTR lptempPtr[2], ax   //Get DriverTimeOut Segment
        LANTimerCallBackBuff.TimerCallBackAddress = lptempPtr;
        LANTimerCallBackBuff.MaxCount = ActivityPollTicks;
        LANCHIMPCallBuff.CSDBuffer = (LPVOID) &LANTimerCallBackBuff;
        CHIMP95Entry(TIMERCALLBACK, (LPCHIMPCallBuffStruct) &(LANCHIMPCallBuff, 0, 0);
lblDriverTimeOut_L90:
        //Restore segment registers
        __asm pop   es
        __asm pop   ds
        return;
}
```

What is claimed is:

1. A computer system, comprising:

a computer comprising:

a power source having a power source output, an computer/card connector into which a plug-in card may be inserted, the computer/card connector including a computer power connector element, and a computer power transmission line communicating between the power source output and the computer power connector element;

a plug-in card receivable into the computer/card connector, the plug-in card comprising:

a card/computer connector having at least one card power connector element which is in electrical communication with the computer power connector element when the card/computer connector is connected to the computer/card connector, a power-consuming component on the plug-in card having a power consumption input, a card power transmission line communicating between the card power connector element and the power consumption input of the power-consuming component, and a card/data link connector that may be mated with a remote data link;

a status monitor in one of the computer or the plug-in card, the status monitor having a status monitor output signal indicative of the operability of the card/data link connector and the operability of the remote data link;

a controllable power connect switch disposed in one of the computer power transmission line and the card power transmission line, whereby the power source output is in electrical power communication with the power consumption input when the power connect switch is closed and the plug-in card is received into the computer/card connector, and is not in electrical power communication with the power consumption input when the power connect switch is open and the plug-in card is received into the computer/card connector, the power connect switch having a control input which determines whether the power connect switch is open or closed; and a power controller in operable communication with the control input of the power connect switch, the power controller receiving and acting responsively to the status monitor output signal.

2. The computer system of claim 1, wherein the power source is a battery.

3. The computer system of claim 1, wherein the computer/card connector is a 68-pin connector.

4. The computer system of claim 1, wherein the plug-in card is a local area network card.

5. The computer system of claim 1, wherein the plug-in card is a small computer systems interface card.

6. The computer system of claim 1, wherein the plug-in card is a modem card.

7. The computer system of claim 1, wherein the plug-in card is an audio speaker card having an external connection to a sound-producing element.

8. The computer system of claim 1, wherein the plug-in card is a video grabber card.

9. The computer system of claim 1, wherein the status monitor comprises a data received flag.

10. The computer system of claim 1, wherein the status monitor comprises a good-link signal.

11. The computer system of claim 1, wherein the status monitor comprises a self-directed data packet.

12. The computer system of claim 1, wherein the power connect switch is located within the computer.

13. The computer system of claim 1, wherein the power connect switch is located on the plug-in card.

14. The computer system of claim 1, wherein the power controller comprises a programmable processing unit.

15. The computer system of claim 1, wherein the computer/card connector is externally accessible such that the plug-in card may be inserted therein without exposing the interior of the computer.

16. A computer system, comprising:
a computer comprising
a power source, and
an externally accessible computer/card connector into which a plug-in card may be inserted without exposing the interior of the computer, the computer/card connector including a computer power connector element in communication with the power source,
a plug-in card receivable into the externally accessible connector, the plug-in card comprising
a card/computer connector having at least one card power connector element which is in electrical communication with the computer power connector element when the card/computer connector is connected to the computer/card connector,
a power-consuming component on the plug-in card having a power consumption input,
a card/data link connector that may be mated with a remote data transmission link; and
power management means
for sensing the operability of the card/data link connector and the operability of the remote data link for data transmission,
for providing power from the power source to the power-consuming component when the card/data link connector and the remote data link are operable for data transmission, and
for disabling power from the power source to the power-consuming component when the card/data link connector and the remote data link are not operable for data transmission.

17. The computer system of claim 16, wherein the power source is a battery.

18. The computer system of claim 16, wherein the power management means comprises
a status monitor indicative of the operability of the card/data link connector and the remote data link, and
a power connect switch operable responsive to the status monitor.

19. A computer system, comprising:
a computer having a power source and a computer/card connector;
a plug-in card with remote data link capability, the plug-in card drawing power from the power source; and
power management means
for sensing the operability of the remote data link capability when the plug-in card is inserted into the computer/card connector,
for providing power from the power source to the plug-in card when the plug-in card is inserted into the computer/card connector and when the remote data link capability is operable, and
for disabling power from the power source to the plug-in card when the plug-in card is inserted into the computer/card connector and when the remote data link capability is not operable.

20. A method for conserving power in a computer system, comprising the steps of
providing a computer having a power source and a computer/card connector;
providing a plug-in card with remote data link capability, the plug-in card drawing power from the power source;
sensing the operability of the remote data link capability when the plug-in card is inserted into the computer/card connector;
providing power from the power source to the plug-in card when the plug-in card is inserted into the computer/card connector and when the remote data link capability is simultaneously operable, and
disabling power from the power source to the plug-in card when the plug-in card is inserted into the computer/card connector and when the remote data link capability is not operable.

* * * * *